United States Patent
Bills

(10) Patent No.: US 7,221,141 B2
(45) Date of Patent: May 22, 2007

(54) SWITCHED MEASURING SYSTEM AND METHOD FOR MEASURING RADIANT SIGNALS

(75) Inventor: David M. Bills, Orlando, FL (US)

(73) Assignee: Xytrans, Inc., Orlando, FL (US)

( * ) Notice: Subject to any disclaimer, the term of this patent is extended or adjusted under 35 U.S.C. 154(b) by 0 days.

(21) Appl. No.: 11/176,467

(22) Filed: Jul. 7, 2005

(65) Prior Publication Data

US 2006/0022662 A1     Feb. 2, 2006

Related U.S. Application Data

(60) Provisional application No. 60/587,994, filed on Jul. 14, 2004.

(51) Int. Cl.
G01R 23/04    (2006.01)

(52) U.S. Cl. ...................................................... 324/95

(58) Field of Classification Search ............. 324/76.14, 324/750, 765, 158.1, 95–96; 343/703, 876; 455/426.1
See application file for complete search history.

(56) References Cited

U.S. PATENT DOCUMENTS

| | | | |
|---|---|---|---|
| 3,611,042 A * | 10/1971 | Boronkay | 361/91.5 |
| 3,725,930 A | 4/1973 | Caruso, Jr. | 343/100 |
| 3,777,270 A | 12/1973 | Hardy et al. | 325/363 |
| 4,521,861 A | 6/1985 | Logan et al. | 364/517 |
| 4,557,272 A | 12/1985 | Carr | 128/736 |
| RE33,791 E | 1/1992 | Carr | 374/122 |
| 5,149,198 A | 9/1992 | Sterzer | 374/139 |
| 5,176,146 A * | 1/1993 | Chive et al. | 600/549 |
| 5,198,776 A | 3/1993 | Carr | 324/639 |
| 5,202,692 A | 4/1993 | Huguenin et al. | 342/179 |
| 5,248,977 A | 9/1993 | Lee et al. | 342/25 |
| 5,438,336 A | 8/1995 | Lee et al. | 342/174 |
| 5,815,113 A | 9/1998 | Lo et al. | 342/351 |
| 5,999,121 A | 12/1999 | Salonen | 342/351 |
| 6,414,606 B1 | 7/2002 | Yujiri et al. | 340/901 |
| 6,439,763 B2 | 8/2002 | Roeder et al. | 374/1 |
| 7,002,511 B1 * | 2/2006 | Ammar et al. | 342/134 |
| 2001/0019572 A1 | 9/2001 | Roeder et al. | 374/1 |
| 2004/0057496 A1 | 3/2004 | Roeder | 374/129 |
| 2004/0066327 A1 | 4/2004 | Salmon | 342/351 |

FOREIGN PATENT DOCUMENTS

JP           59 046542        3/1984

OTHER PUBLICATIONS

Nakano, et al., "*A Broadband Microwave Radiometer Using Correlation Technique*," IEEE Transactions on Instrumentation and Measurement, IEEE Inc., vol. 48, No. 2, Apr. 1999, pp. 631-633.
Patent Abstracts of Japan, vol. 005, No. 113, Nov. 13, 1981 and JP 56 108947, Mitsubishi Electric Corp., Aug. 28, 1981, 1 page.
Zhang, et al.,. "*Research for 3MM Band IF-Switch Radiometer*," International Journal of Infrared and Millimeter Waves, vol. 22, No. 6, Jun. 6, 2001, pp. 887-893.

* cited by examiner

Primary Examiner—Ha Tran Nguyen
Assistant Examiner—Tung X. Nguyen
(74) Attorney, Agent, or Firm—Allen, Dyer, Doppelt, Milbrath & Gilchrist, P.A.

(57) ABSTRACT

A system for measuring radiant signals includes a detector circuit for detecting a time multiplexed, measured radiant signal and reference signal. A switch is connected to the detector circuit for receiving signals from the detector circuit. A measured signal sampling circuit, a reference signal sampling circuit, a measured alias circuit and a reference alias circuit are connected to the switch, which is operative for switching among the sampling and alias circuits to remove sampling noise and improve switching latency.

8 Claims, 3 Drawing Sheets

SWITCHED MEASURING SYSTEM AND METHOD FOR MEASURING RADIANT SIGNALS

RELATED APPLICATION

This application is based upon prior filed copending provisional application Ser. No. 60/587,994, filed Jul. 14, 2004.

FIELD OF THE INVENTION

The present invention relates to the field of measuring radiant signals, and more particularly, the present invention relates to measuring radiant signals by switching between a reference signal and measured radiant signal.

BACKGROUND OF THE INVENTION

In radiometers and other radiant signal measurement systems that switch between a reference signal and measured radiant signal, focal plane arrays are sometimes used to form images from radiation received by a reflector antenna. Millimeter wave (MMW) focal plane array radiometers also have been used in many applications to form images based on thermal sensing of radiated microwave energy. The sensitivity of existing radiometer designs, however, has been limited to about 1 deg K, resulting in poor images.

The principle of operation of the radiometric technique is fully described in the literature. The design of a typical radiometer is based on the technique of comparing the level of electromagnetic noise emitted by an unknown source to a reference or stable noise source. This technique and devices were initially proposed by Dicke [R. H. Dicke, "The Measurement of Thermal Radiation at Microwave Frequencies," The Review of Scientific Instruments, Vol. 17, No. 7, July 1946].

In a Dicke radiometer circuit, the signals from typically an antenna or other source are sampled and compared with signals from a reference source maintained at a known constant temperature. This overcomes some of the problems of amplifier instability, but in general does not alter effects resulting from imperfect components and thermal gradients.

While other types of radiometric devices have been used with some success, the Dicke (or comparison) type of radiometer has been the most widely used for the study of relatively low level, noise-like millimeter wave signals, especially where the noise signals to be examined are often small in comparison to the internally generated noise level within the radiometer receiver. While there are several types of comparison radiometers, one popular type of radiometer for use in the microwave/millimeter wave frequency bands compares an incoming signal to be measured to a standard or calibrated reference noise signal. This type of radiometer compares the amplitude of an unknown noise signal coming from the source to be examined with a known amplitude of a noise signal from a calibration source. This method has been found useful in measuring with considerable accuracy the effective temperature of an unknown source.

In the Dicke or comparison type radiometer, the receiver input is switched between typically the antenna and a local reference signal noise generator. The detected and amplified receiver output is coupled to a phase-sensing detector operated in synchronism with the input switching circuit. The output signal from the radiometer receiver is proportionate to the difference between the temperature of the reference signal source and the temperature of the source viewed by the antenna, inasmuch as the phase-sensing detector acts to subtract the background or internal noise of the receiver.

It should be understood that the Dicke radiometer typically uses a radio frequency (RF) switch coupled between an antenna and a radiometer receiver, allowing the receiver to alternate between the antenna and a known reference load termination. The receiver output is connected to the synchronous detector that produces an output voltage proportional to a difference between the antenna and the reference temperature. Null balance operation for the Dicke radiometer is typically achieved by coupling in noise from a hot noise diode to the antenna port of the RF switch, allowing the system to match the temperature from standard reference loads.

These types of systems typically use time multiplexed circuits with either analog or RF inputting and gain stages. An output is formed as a differential analog level. These circuits could be similar to existing chopper circuits for analog applications, and a Dicke switch for RF applications. These type of circuits can also be used in instrumentation circuits and measurement circuits that evaluate small changes in a signal.

Some switched measurement systems currently in use have been inadequate because the systems do not correctly compensate for gain variations caused by temperature drift from the temperature at which the system was calibrated. Most existing systems use a thermal control system, for example, a Peltier cooler, which adds an extra cost and an extra power usage to the system.

The Dicke switch is an adequate RF measurement system when it operates in the presence of a large DC or noise offset associated with the measurement reading, typically at a smaller scale. The reference reading can be used to null, or subtract-out from the measurement reading. The Dicke switch system typically uses the time multiplexed circuit where the input is switched between the measurement and the reference in a regular pattern. This allows the same circuit hardware to amplify the signals, resulting in identical system gain for both the measurement and the reference. This common gain allows for a linear subtraction of measurement and reference.

One primary application of this type of system is a radiometer, which measures a small amount of noise variation in a large noise offset. The reference reading is calibrated to be offset at the calibration temperature. The radiometer output is supplied to a log power detector circuit and converted to an analog level, which alternates in time between the measurement and the reference. A controller evaluates the analog levels and performs system operations, whether in analog or digital.

In these types of systems for example, the Dicke switch radiometer have several drawbacks in some applications, however. For example, a large amount of time is sometimes required for the analog level to stabilize after switching. There is also no allowance for system gain control, thus adding large measurement inaccuracies unless precise temperature control is maintained.

SUMMARY OF THE INVENTION

In accordance with one aspect, a system measures radiant signals and includes a detector circuit for detecting a time multiplexed, measured radiant signal and reference signal. A switch is connected to the detector circuit for receiving signals from the detector. A measured signal sampling circuit, a reference signal sampling circuit, a measured alias circuit and a reference alias circuit are connected to the switch, which is operative for switching among these circuits to remove sampling noise and improve switching latency.

In one aspect, the switch is operative in a switching order of the reference signal sampling circuit, the measurement alias circuit, the measured signal sampling circuit and then the reference alias circuit. A Dicke switch is operatively connected to the detector circuit and operative for switching between a measured radiant signal and reference signal before detecting within the detector circuit. An automatic gain control feedback circuit is also operative between the reference signal sampling circuit and detector circuit for controlling gain. Filters can be positioned within each of the measured signal sampling circuit and reference signal sampling circuit. These filters can be formed as low-pass filters. An amplifier can be operative with the measured signal sampling circuit and reference signal sampling circuit for amplifying signals received therefrom. The measured radiant signal can typically be formed as a radio frequency signal.

In another aspect, a system measures radiant signals and includes a switch for switching between a detected and time multiplexed, measured radiant signal and reference signal. An automatic gain control feedback circuit is operative for controlling gain based on the reference signal.

A method of measuring radiant signals is also disclosed and includes the detecting of a time multiplexed, measured radiant signal and reference signal to produce a detected signal, and switching the detected signal between a measured signal sampling circuit, a reference signal sampling circuit, a measured alias circuit and a reference alias circuit to remove sampling noise and improve switching latency.

BRIEF DESCRIPTION OF THE DRAWINGS

Other objects, features and advantages of the present invention will become apparent from the detailed description of the invention, which follows when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Different sections are improved in a switched measuring system to be described, e.g., (1) a secondary, or output analog switch; (2) an analog amplification system; (3) an automatic gain control loop; and (4) a timing methodology of various circuit stages.

In one aspect, the system has an added temperature error compensation, and it is insensitive to gain drift errors regardless of source. It is also insensitive to drift in values of passive components. This system does not require direct control of input gain stages, typically RF amplifiers, and uses standard architecture in the front end while allowing improved system sensitivity, for example, when used with a radiometer. Many of the detrimental effects of switching noise are removed from the present measurement system as described, allowing fast settling time and increased switching speed over standard systems.

Figure 1:
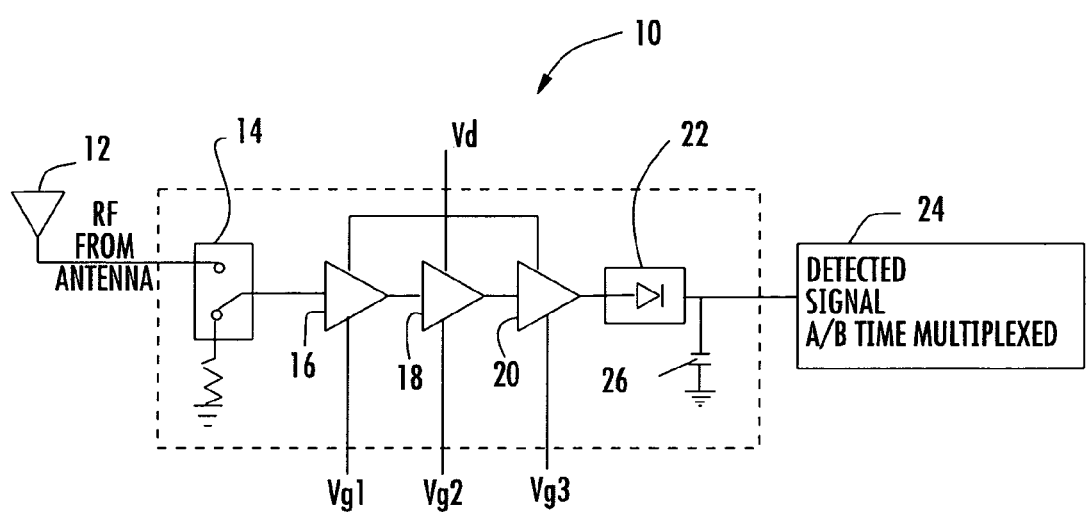
FIG. 1 is a schematic circuit diagram of a traditional prior art RF stage of a Dicke switch measurement system.

FIG. 1 is a schematic circuit diagram of the RF stage of a traditional prior art Dicke switch measurement system 10. A radio frequency signal is received at the antenna 12 and passes into the Dicke switch 14. The signal exits into three sequential RF amplifiers 16, 18 and 20. The detected signal is detected at a detector circuit 22 and A/B time multiplexed as an output 24. Some filtering/buffering can be provided by capacitor 26 and power for comparator RF amplifiers 16, 18 and 20 can be provided at Vd. Some circuit control is obtained through respective Vg1, Vg2 and Vg3 inputs into RF amplifiers 16, 18 and 20.

Figure 2:
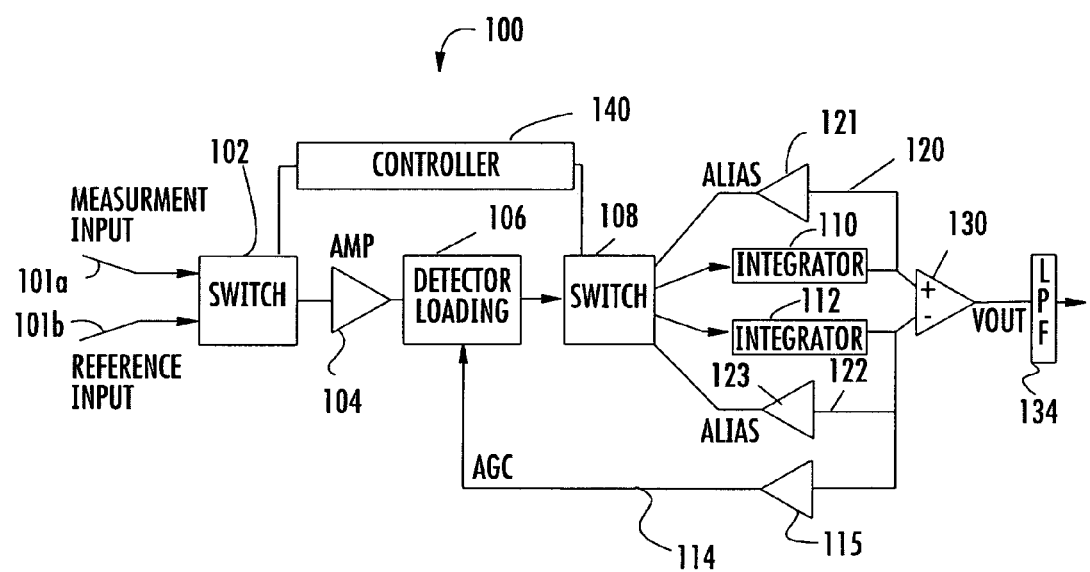
FIG. 2 is a block diagram of a measurement system in accordance with one example of the present invention.

FIG. 2 is a high level block diagram of a precision measurement system 100 in accordance with one non-limiting example of the present invention and showing basic functional elements. Measurement and reference inputs 101a, 101b are received at a switch 102, for example, a Dicke or other switch as non-limiting examples. The switched output signal, typically as a time multiplexed signal from the switch 102, is amplified within amplifier 104 and detected (typically phase detected) within detector loading circuit 106. Although only one amplifier 104 is illustrated, a larger number of amplifiers can be used. A second switch 108 switches between integration and alias circuits. The integration circuits are sampling. circuits and the terms in this description are interchangeable, for purposes of clarity. As illustrated, the signal passes through two integrator (or sampling) circuits 110, 112 formed respectively as a measured signal integrator (sampling) circuit 110 and reference signal integrator (sampling) 112. An automatic gain control feedback circuit 114 feeds back signals from the reference into the detector loading circuit 106. This automatic gain control feedback circuit 114 includes an operational amplifier 115. Respective measured and reference alias circuits 120, 122 feedback into the switch 108 from both measured signal and reference signal integrator (sampling) circuits 110, 112. Both alias circuits 120, 122 include respective measured and reference operational amplifiers 121, 123. An instrument amplifier 130 receives the signals from the integrator (sampling) circuits 110, 112 and provides an output, which in one non-limiting example, is received into a time constant low pass filter 134. A controller 140 is operative with the switches 102, 108 and controls the switching among the inputs at the front-end, and the sampling and alias circuits for proper timing and any time multiplexing control.

Figure 3:
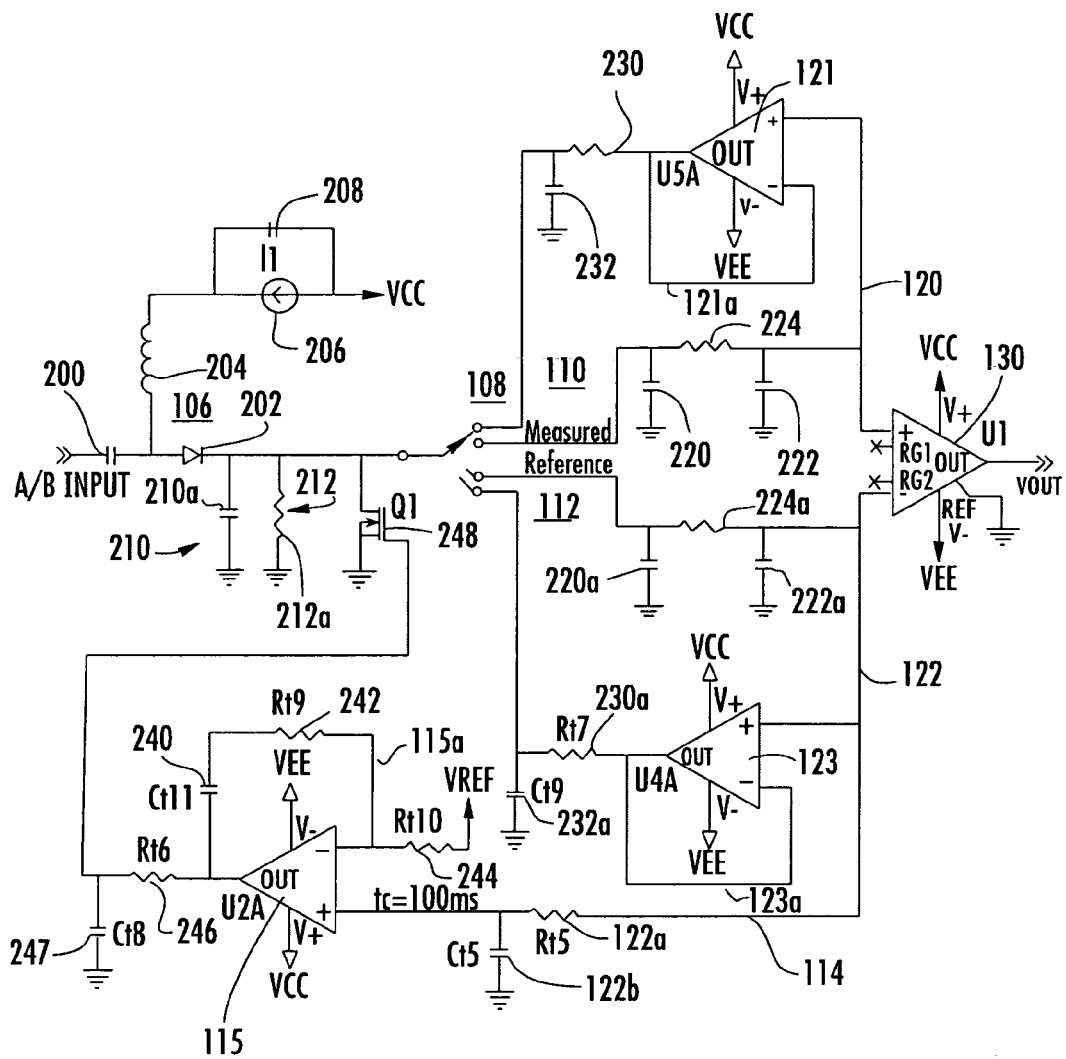
FIG. 3 is a schematic circuit diagram showing greater details of a measurement system, such as shown in the example of FIG. 2, without showing the input switch, input reference, or input amplifier.

FIG. 3 is a more detailed schematic circuit diagram of a portion of the precision measurement system 100 shown in FIG. 2. Basic functional components described relative to FIG. 2 are shown in FIG. 3. The schematic circuit diagram of FIG. 3 does not show the input switch 102, input measurement or reference signals 101a, 101b or input amplifier 104 as shown in FIG. 2. The schematic circuit diagram shown in FIG. 3 illustrates the basic components shown in FIG. 2 following the amplifier 104, including the detector loading circuit 106, the switch 108, the two integrator (sampling) circuits 110, 112, the instrument amplifier 130, the two alias circuits 120, 122, and the feedback automatic gain control circuit 114.

Signals are input from the amplifier circuit 104 shown in FIG. 2 into the detector loading circuit 106, which includes an RF capacitor 200 and detector diode 202. An inductor coil 204 connects between the RF capacitor 200 and detector diode 202. The inductor coil 204 is serially connected into device source 206 with power terminal Vcc. A capacitor 208 is connected in parallel. The detector loading circuit 106 includes two sampling circuits 210, 211. The first sampling circuit 210 includes a grounded capacitor 210a and the second sampling circuit 212 includes a grounded resistor 212a, both forming respective loads after the diode 212 and operative with switch 108.

From the detector loading circuit 106, a signal passes into the switch 108 and is switched into the measured signal sampling circuit 110, reference signal sampling circuit 112, measured alias circuit 120, or reference alias circuit 122. The measured signal sampling circuit 110 includes a pie configuration of parallel grounded capacitors 220, 222 and a series resistor 224. The reference signal sampling circuit 112 is used with a reference signal and includes a similar circuit having parallel capacitors 220a, 222a and a series resistor 224a in a pie configuration. The measured alias circuit 120 includes the operational amplifier 121 with appropriate feedback input into the non-inverting input and feedback 121a from the output to the inverting input. The output is fed into a resistor 230 and grounded capacitor 232 and into the switch 108, as illustrated. The reference alias circuit 122 includes the operational amplifier 123 having an input into the non-inverting input and feedback 123a from its output to the inverting input, and connected to the output resistor 230a and grounded capacitor 232a.

The feedback circuit 114 for the automatic gain control includes a resistor 122a and grounded capacitor 122b connected into the non-inverting input of the operational amplifier 115. Feedback circuit 115a includes a series connected capacitor 240 and resistor 242. The voltage reference is connected into the inverting input through a resistor 244. An output resistor 246 and grounded capacitor 247 connect into a transistor 248 as part of the detector loading circuit 106.

The circuit 100 as described provides an improved output analog switch. In the standard Dicke switch, a secondary switch may or may not exist. In any event, the switching latency is defined by the duration of time for the analog level to stabilize from the measurement to the reference level. The circuit as described overcomes this switching latency by an enhancement that includes incorporating two low frequency analog sections located after the RF detector diode 202. The analog switch 108 is placed after the detector diode 202, which includes the small RF to low frequency AC capacitor 210a and load 212a. The two separate sampling circuits 110, 112 with low pass filter networks 220, 220a, 222, 222a, 224, 224a do not have a load associated, and thus, can maintain the DC level as detected for their associated switching time. This circuit is advantageous because two analog levels are present and the settling time for the detector diode to the final analog level is reduced.

Some switching noise will be present as a DC offset to the analog level because the RF capacitor 200 at the diode 202 maintains the analog level of the previous state at the moment the switching occurs. The charge in the RF capacitor 200 will affect the subsequent analog sampling circuit based on the capacitor's value and the switching rate. By reducing the switching rate, the amount of perturbations in the analog level are reduced, thereby reducing the DC offset proportionally.

This switching circuit also includes what is termed a modified "break before make" switching network as part of the switch 108. Each analog sampling circuit 110, 112 includes an output that feeds the respective alias circuits 12, 122, which include the operational amplifiers 121, 123, each of which feeds a capacitor 232, 232a that is significantly larger than the detector RF capacitor 200. These larger capacitors will be roughly the level as that of the sampling circuit that it represents.

The switch 108 is operative for switching between four outputs, i.e., two of the regular sampling (measured signal and reference signal) circuits 110, 112, and the associated measured and reference alias circuits 120, 122. The aliasing circuits 120, 122 absorb most of the switching noise prior to moving to the actual sampling circuits 110, 112. This is accomplished in one non-limiting example by a switching order beginning with the starting state of sampling the reference, to a brief period of the measurement alias, followed by the measurement sampling. This is followed by a brief period in the reference alias, followed by the reference sampling circuit. The switching noise is removed from the sampling circuits 110, 112 because the capacitors in the alias circuits stabilize the RF capacitor roughly to the same level as that of the sampling circuits. Any fluctuations in the alias circuits do not directly move to the sampling circuits because of the use of the instrument amplifier 130.

The circuit as described with reference to FIGS. 2 and 3 includes an improved analog amplification system. In the standard Dicke switch the output of a circuit is amplified by an analog amplifier. This type of circuit can have a gain variation over temperature because of the temperature drift in the gain resistors when a standard operation amplifier is used.

The circuit 100 as described includes an instrument amplifier 130 connected as described before to subtract the reference voltage from the measurement. The instrument amplifier 130 typically has a fixed gain and is selected based-on the input leakage current, input offset voltage, and gain stability. This circuit should also be optimized for minimal offset errors for the best output results. The output gain can be scaled so that the measurement system, whether analog or digital, can effectively use the range. A benefit of the instrument amplifier 130 is that the output may be adjusted by applying an offset resulting from an output reference pin. This allows a direct interface to the measurement system.

Because a radiometer has a slow effective sampling time in relation to its sensitivity, a longer time constant based low pass filter 134 is inserted after the output of the instrument amplifier 130. This is an ideal location for adding this filter, for example, an adjustable time constant low pass filter because any errors will not have the gain from the instrument amplifier applied to it.

The circuit 100 as described also has an automatic gain control feedback loop circuit 122. Gain control does not exist on a standard Dicke switch. This advantageous use of dual sampling circuits 110, 112 allows both the measurement and the reference voltages to be present as independent levels. It is typically assumed that the reference will be a fixed noise level, and therefore, the only variations to an output analog voltage are due to system gain fluctuations. This could allow a fixed reference voltage comparison to the reference sampling voltage. The output of the comparison can directly drive any attenuation adding circuitry in the RF amplifier stages or a load resistor with a parallel MOSFET acting as a variable resistor. This could directly adjust the system gain.

By holding the reference voltage at a constant level, the system gain is held constant, regardless of temperature. The gain of the input stage is determined by the resistor 212a after the detector diode 202. Therefore adjusting the network resistance will directly adjust the system gain. There will be some errors in the system gain, which can be associated with a comparison amplifier, and the reference itself. These levels, however, are much lower than the typical system gain errors. Improved gain control may be arrived at by using a digital or analog calibration system and adjusting the voltage reference to the automatic gain control circuit.

The circuit 100 as describes also has an improved timing methodology for the different circuit stages. For example, a typical Dicke switch in a radiometer design has an inherent loss of sensitivity to the measured temperature, often by 50% because the amount of "ON" target time is reduced by one-half, resulting from the time multiplexed switching. The circuit as described overcomes a significant proportion of that loss due to a change in the percentages of the switching time. The use of two separate analog systems as described allows the ability to have asymmetrical percentages of switching periods. Normally, sensitivity increases when the time-on-target is increased, but this is counter-productive to the real environment where the time on target needs to be reduced to increase the amount of samples taken across a given time. By increasing the percentage of time that is spent on the measured signal in proportion to the reference signal, an improved sensitivity can be realized. The reference signal is assumed not to change. Therefore, an equivalent sensitivity to the measured signal may still be realized by increasing the time-on-target for the reference signal, which is assumed not to change.

Typical percentages for this type of system could appear with 5% of the period on the reference alias, 10% on the reference sampling, 5% on the measurement, leaving 80% on the measurement sampling. This would result in an increase in the sensitivity without a change in the time on target for the proposed system by 80% over that normally found on the Dicke switch based radiometer.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed.

That which is claimed is:

1. A system for measuring radiant signals comprising:
    a detector circuit for detecting a time multiplexed, measured radiant signal and reference signal;
    a switch connected to the detector circuit for receiving signals from the detector; and
    a measured signal sampling circuit, a reference signal sampling circuit, a measured alias circuit and reference alias circuit connected to said switch, wherein said switch is operative for switching among the sampling and alias circuits to remove sampling noise and improve switching latency.

2. A system according to claim 1, wherein the switch is operative in a switching order of the reference signal sampling circuit, the measurement alias circuit, the measured signal sampling circuit and then the reference alias circuit.

3. A system according to claim 1, and further comprising a Dicke switch operatively connected to said detector circuit and operative for switching between a measured radiant signal and reference signal before detecting within the detector circuit.

4. A system according to claim 1, and further comprising an automatic gain control feedback circuit operative between the reference signal sampling circuit and detector circuit for controlling gain.

5. A system according to claim 1, and further comprising filters positioned within each of the measured signal sampling circuit and reference signal sampling circuit.

6. A system according to claim 5, wherein said filters comprise low-pass filters.

7. A system according to claim 1, and further comprising an amplifier operative with said the measured signal sampling circuit and the reference signal sampling circuit for amplifying signals received therefrom.

8. A system according to claim 1, wherein the measured radiant signal comprises a radio frequency signal.

* * * * *